US008539548B1

(12) United States Patent
Overby, Jr. et al.

(10) Patent No.: US 8,539,548 B1
(45) Date of Patent: Sep. 17, 2013

(54) TIERED NETWORK POLICY CONFIGURATION WITH POLICY CUSTOMIZATION CONTROL

(75) Inventors: Linwood H. Overby, Jr., Raleigh, NC (US); Kimberly T. Bailey, Raleigh, NC (US); Jeffrey B. Cates, Raleigh, NC (US); Mark T. Wright, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/458,610

(22) Filed: Apr. 27, 2012

(51) Int. Cl.
*G06F 21/00* (2006.01)
(52) U.S. Cl.
USPC .................. 726/1; 726/3; 726/21; 726/27
(58) Field of Classification Search
None
See application file for complete search history.

(56) References Cited

U.S. PATENT DOCUMENTS

| 7,069,437 | B2 | 6/2006 | Williams |
| 2002/0093527 | A1 | 7/2002 | Sherlock |
| 2004/0230792 | A1* | 11/2004 | McCarty ............... 713/153 |
| 2006/0015416 | A1* | 1/2006 | Hoffman et al. ........... 705/28 |
| 2007/0199049 | A1 | 8/2007 | Ziebell |
| 2007/0261121 | A1 | 11/2007 | Jacobson |
| 2008/0235759 | A1* | 9/2008 | McCarty ..................... 726/1 |
| 2009/0254970 | A1* | 10/2009 | Agarwal et al. ............ 726/1 |

FOREIGN PATENT DOCUMENTS

| WO | 0198932 A2 | 12/2001 |
| WO | 2004095801 A1 | 11/2004 |

OTHER PUBLICATIONS

IBM RACF/ The History of RACF, Downloaded http://www-03.ibm.com/systems/z/os/zos/features/racf/racfhist.html, (Mar. 11, 2012), p. 1-6.
IBM Resource Access Control Facility (RACF), Downloaded http://www-03.ibm.com/systems/z/os/zos/features/racf/?ca=zserieszracf/servers/eserver/zseries/racfmet=zracf/servers/eserver/zseries/racfme=W, (Nov. 2008), p. 1.
IBMZOS, IBM United States Software Announcement 211-252, http://www.ibm.com/planetwide/us/, (Jul. 12, 2011), p. 1-48.
Overby, "Got the world on your shoulders?", z/OS Hot Topics Newsletter, Issue 13, (Aug. 2005), p. 40-42.
RACF, What is Resource Access Control Facility (RACF)?, Downloaded http://searchdatacenter.techtarget.com/definition/Resource-Access-Control-Facility, (Mar. 11, 2012), p. 4.

* cited by examiner

*Primary Examiner* — Hadi Armouche
(74) *Attorney, Agent, or Firm* — David Mims; Mark P Kahler

(57) ABSTRACT

A hierarchical administrative system centrally controls configuration of network security policy for a group of information handling systems (IHSs) by multiple tier levels of administration. The highest tier level of administration builds policies that fulfill IT security policy intent. Higher level administrators may scope subordinate administrators to a group of IHSs or a single IHS. Higher level administrators may allow subordinate administrators to perform system specific customization of the policy based on permissions that the higher level administrator grants. Customization may include completing partially-built rule conditions with IP address and port, completing partially-built rule actions, and adding or deleting rules based on IHS unique applications or security requirements. A security enforcement tool may enforce customizations of network security policy. A security policy administration tool along with the security enforcement tool may detect attempts to work around the administrative system, and alerts higher tier level administrators and/or takes remedial action.

20 Claims, 7 Drawing Sheets

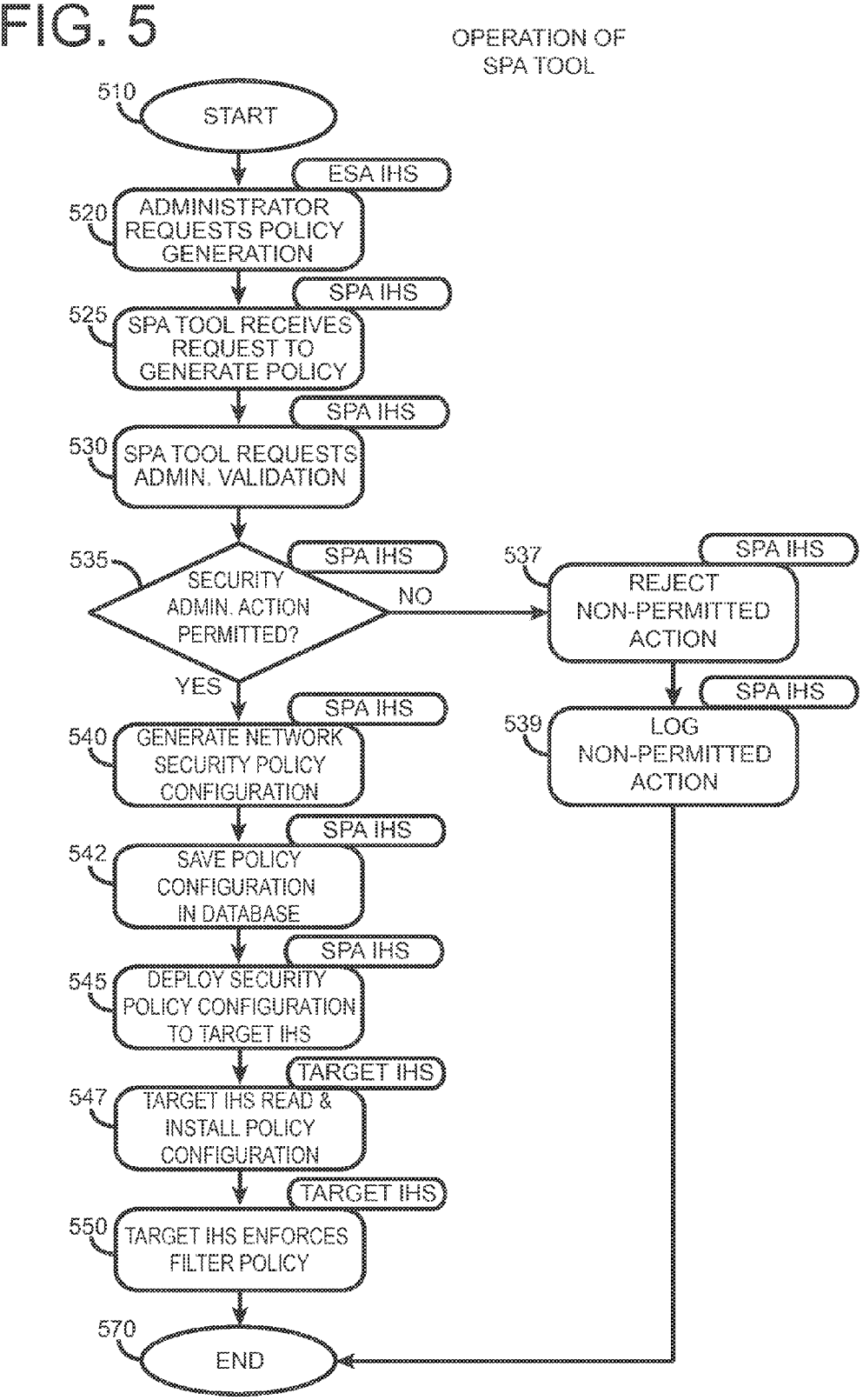

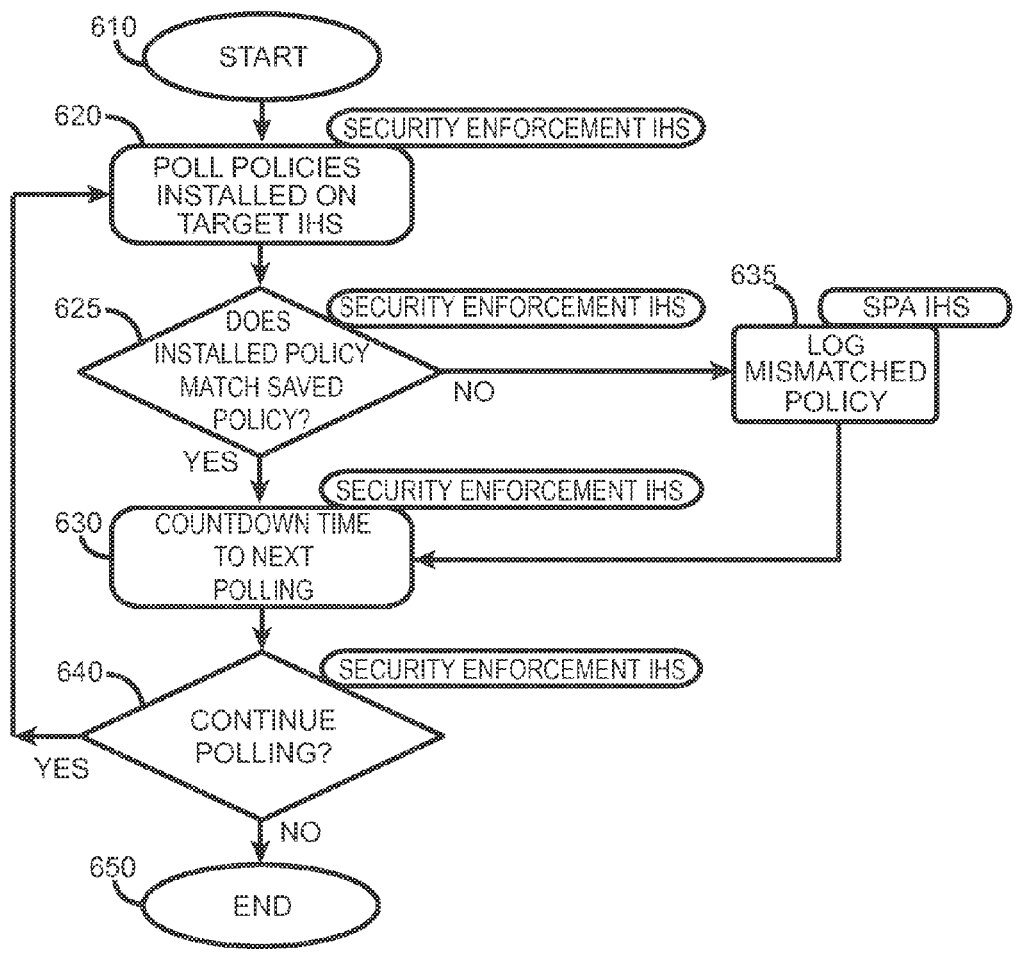

TIERED NETWORK POLICY CONFIGURATION WITH POLICY CUSTOMIZATION CONTROL

BACKGROUND

The disclosures herein relate generally to policy configuration in information handling systems (IHSs), and more specifically, to policy configuration in networked IHSs. Administrators may generate policies for an enterprise network of IHSs, and may propagate the policies throughout IHSs in the network. Network policies, and more specifically security policies, may increase the security of networked IHSs.

BRIEF SUMMARY

In one embodiment, a method is disclosed for security policy handling in a enterprise network with multiple tier levels of security administration. The method includes providing, at a security policy administration (SPA) information handling system (IHS) in an enterprise network, a security policy administration (SPA) tool that is responsive to a first tier level security administrator and a plurality of second tier level security administrators, wherein the plurality of second tier level security administrators are subordinate to the first tier level security administrator. The method also includes providing, at data centers, respective security enforcement IHSs, wherein the security enforcement IHS at each data center includes a respective security enforcement tool. The method further includes receiving, by the SPA tool, a policy generation request from a first user. The method still further includes testing, by the SPA tool, to determine if the first user is an authorized first tier level security administrator. The method also includes generating a policy, by the SPA tool, in response to the policy generation request if the first user is determined to be an authorized first tier level security administrator. The generating of the policy includes generating, by the SPA tool, a first policy configuration that is customizable by an authorized second tier level security administrator, thus providing a first customizable policy configuration. The method also includes storing, by the SPA tool, the first customizable policy configuration in a policy configuration database. The method also includes transmitting, by the SPA tool, the first customizable policy configuration to a target IHS within a particular data center. The method still further includes receiving, by the SPA tool, a policy customization request from a second user. The method further includes testing, by the SPA tool, to determine if the second user is an authorized second tier level security administrator. The method also includes modifying, by the SPA tool, the stored first customizable policy configuration as requested in the policy customization request of the second user if the second user is determined to be an authorized second tier level security administrator.

In one embodiment of the method, the security enforcement tool at a particular data center tests to determine if an installed policy configuration in a particular target IHS matches the stored policy configuration in the policy configuration database. The security enforcement tool may limit operation of the particular target IHS if the installed policy configuration does not match the stored policy configuration in the policy configuration database. The security enforcement tool may disallow the policy customization request from the second user if the second user is determined to not be an authorized second tier level security administrator.

In another embodiment, an enterprise network includes a plurality of data centers that each include respective security enforcement information handling systems (IHS). The security enforcement IHS at each data center includes a respective security enforcement tool. The enterprise network includes a security policy administration (SPA) IHS that includes a security policy administration (SPA) tool. The SPA tool is responsive to a first tier level security administrator and a plurality of second tier level security administrators, wherein the plurality of second tier level security administrators are subordinate to the first tier level security administrator. The SPA tool receives a policy generation request from a first user. The SPA tool tests to determine if the first user is an authorized first tier level security administrator. The SPA tool generates a policy in response to the policy generation request if the first user is determined to be an authorized first tier level security administrator. To generate the policy, the SPA tool generates a first policy configuration that is customizable by an authorized second tier level security administrator, thus providing a first customizable policy configuration. To generate the policy the SPA tool also stores the first customizable policy configuration in a policy configuration database, and transmits the first customizable policy configuration to a target IHS within a particular data center of the plurality of data centers. The SPA tool also receives a policy customization request from a second user. The SPA tool further tests to determine if the second user is an authorized second tier level security administrator. The SPA tool still further modifies the stored first customizable policy configuration as requested in the policy customization request of the second user if the second user is determined to be an authorized second tier level security administrator.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 5 is a flowchart that depicts process flow in a security policy administration (SPA) tool that the disclosed enterprise network may employ.

FIG. 6 is a flowchart that depicts process flow in a security enforcement tool that the disclosed enterprise network may employ.

DETAILED DESCRIPTION

In an enterprise network of information handling systems (IHSs), system administrators have responsibility for creating and managing the configuration of network security policies for IHSs within their respective groups in the enterprise. Network security policies govern functions such as IP packet filtering or Internet Protocol Security (IPSec). Network security policies may include a set of policy rules wherein each rule includes a set of conditions and actions. The conditions may include IP addresses, ports, and protocols. The actions may include "block the traffic (deny)" or "allow the traffic" (permit). The actions may also include "permit the traffic if a cryptographic network security protocol such as IPSec protects the traffic". Some of the rule condition and action attributes may be common across all IHSs in a group, and some attributes may be IHS-specific (such as IP address and port). Network security administrators establish and enforce the rules and guidelines for the configuration of policy settings for these IHSs. Network security administrators may use tools for creating and managing configuration and policies, and for enforcing the security policies.

In the disclosed enterprise network, a hierarchical administrative system centrally controls the configuration of network security policy for a group of IHSs by multiple tier levels of administration. A top tier level enterprise security administrator (ESA) operating at the highest tier level of network security administration builds a policy that fulfills the intent of the information technology (IT) security criteria. The ESA may restrict subordinate (lower tier) security administrators (SSAs) to a group of servers or a single server within the enterprise. The ESA at the highest tier level of administration may grant permission to SSAs to perform customizations to policy rules. Customization may include completing partially built rule conditions by supplying the partially built rules with IP address information and port information, by completing partially built rule actions, and by adding or deleting rules based on platform-unique applications or security requirements. In one embodiment, the ESA may enforce all customization of network security policy in a security policy administrative system. A security enforcement tool of the security policy administrative IHS may detect any attempt to work around and/or evade a predetermined network security policy, may log the attempt, and may alert higher-level administrators and/or security personnel, and/or may take remedial action.

Figure 1A:
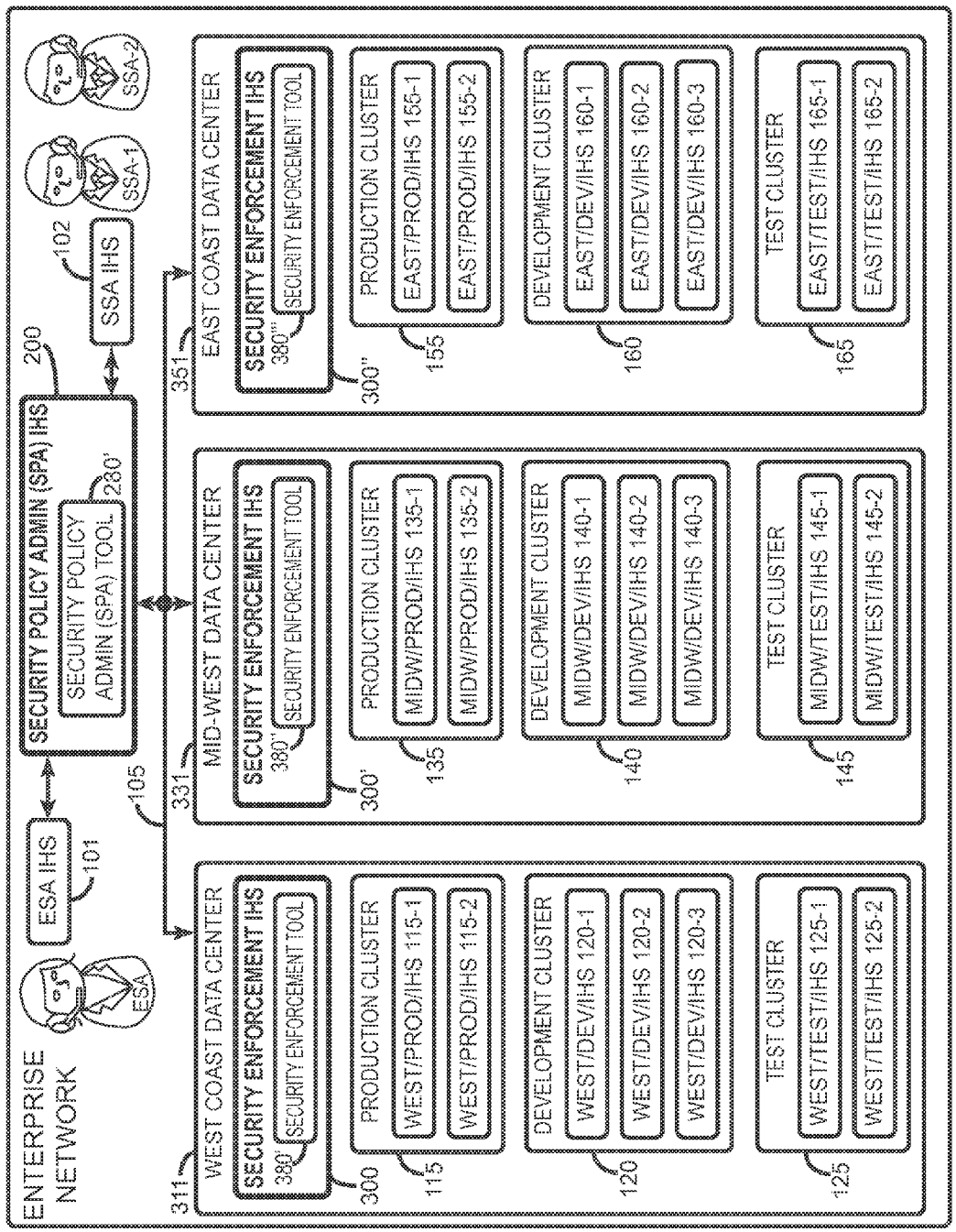
FIG. 1A is a block diagram of one embodiment of the disclosed enterprise network.

FIG. 1A is a block diagram of the disclosed enterprise network 100 that includes multiple network nodes (i.e., IHSs) including ESA IHS 101, SSA IHS 102 and security policy administration (SPA) IHS 200, and network nodes (i.e., IHSs) within the west coast data center (WCDC) 311, the mid-west data center (MWDC) 331 and the east coast data center (ECDC) 351, that collectively form enterprise network 100. Network nodes in enterprise network 100 couple to one another via communication link 105. The Enterprise Security Administrator (ESA) may control and enforce certain network security policies via ESA IHS 101. The ESA gains access to network security policies by logging on to ESA IHS 101 as a network user with a personal user identification and a personal password. An authorization checking component (not shown) in security policy administration tool 280' validates and manages the proper level of authority, and proper security tier, to the network user via the personal user identification and the personal password. Although the ESA may control network security functions via ESA IHS 101, the ESA may also control network functions via other IHSs in enterprise network 100, and/or other network user IHSs (not specifically identified) that may accept the ESA user identification and password. The network security policies may apply to a group of IHSs, while allowing a subgroup of Subordinate Security Administrators (SSAs) (i.e., SSA-1 and SSA-2) to customize one or more individual policy rules within an overall policy set. An SSA may operate via SSA IHS 102. Collectively the IHSs in one embodiment of enterprise network 100 form a closed administrative system that performs all network security policy configuration, administration, and validation.

Some IHSs may not require all of the rules within a particular security policy. For example, in one embodiment, IHSs in groups WCDC 311, MWDC 331, and ECDC 351 must all receive the same set of the IP packet filter policy, "Policy Set WCDC/MWDC/ECDC". The administrator ESA that controls this policy may require that system groups WCDC 311, MWDC 331 and ECDC 351 receive the same set of IP packet filter policy. As an example, information handling systems West/Test/IHS 125-1 and West/Test/IHS 125-2 in test cluster 125 of WCDC 311 may run, i.e. execute, a workload "X" in the enterprise network 100 that may permit FTP traffic from West/Dev/IHS 120-1, West/Dev/IHS 120-2, and West/Dev/IHS 120-3 in development cluster 120, but West/Prod/IHS 115-1, and West/Prod/IHS 115-2 in production cluster 115 may not permit FTP traffic for workload "X". The subordinate system administrator (SSA) for WCDC 311 cannot simply change the policy filter rule for West/Test/IHS 125-1 and West/Test/IHS 125-2 in test cluster 125 of WCDC 311, since this would weaken the higher level security controls. Enterprise network 100 may allow the subordinate system administrator (for example SSA-1 and/or SSA-2) for WCDC 311 to change the rule from "deny" to "permit". The ESA IHS 101, at the direction of the ESA, may generate a single policy for West/Test/IHS 125-1 and West/Test/IHS 125-2 in test cluster 125 of WCDC 311, however this may not allow for a highly reusable model of policy configuration. This embodiment addresses the need for highly reusable security policies, with the ability to customize or override individual rules based upon permissions. WCDC 311 includes security IHS 300 which runs a security tool such as security enforcement tool 380'. MWDC 331 includes security IHS 300' which runs security enforcement tool 380". ECDC 351 includes security IHS 300" which runs security enforcement tool 380'".

IHS groups may include a cluster of IHSs that work in tandem. MIDW/Prod/IHS 135-1 and MIDW/Prod/IHS 135-2 may form a production cluster 135 in MWDC 331. East/Prod/IHS 155-1 and East/Prod/IHS 155-2 may form a production cluster 155 in ECDC 351.

MIDW/Dev/IHS 140-1, MIDW/Dev/IHS 140-2 and MIDW/Dev/IHS 140-3 may form a development cluster 140 in MWDC 331. East/Dev/IHS 160-1, East/Dev/IHS 160-2 and East/Dev/IHS 160-3 may form a development cluster 160 in ECDC 351.

MIDW/Test/IHS 145-1 and MIDW/Test/IHS 145-2 may form a test cluster 145 in MWDC 331. East/Test/IHS 165-1 and East/Test/IHS 165-2 may form a test cluster 165 in ECDC 351. Typically the ESA manages IHSs that may be grouped in clusters as described above, although the ESA may group the IHSs in any other manner as well.

Clusters of IHSs may operate together as targets of a load balancer for certain workloads and such clusters may provide backup/fail-over capabilities. In one embodiment, these IHSs should have exactly the same security configuration and policies to prevent a failure and to prevent a security breach. In one embodiment, the security enforcement tools described above, i.e. security enforcement tool 380', security enforcement tool 380" and security enforcement tool 380'", keep track of these system relationships and ensure that the ESA and/or SSA generates the configuration properly prior to deployment and activation. Otherwise, the security enforcement tools should prevent the generation and deployment of the configuration. The security enforcement tool should detect, for example, that a filter rule that applies to one IHS in a cluster should also apply to a backup IHS in that cluster. The security policy administration tool 280' "understands" which IHSs belong to a particular cluster and generates the proper network security policy configuration across those IHSs in that particular cluster.

Figure 1B:
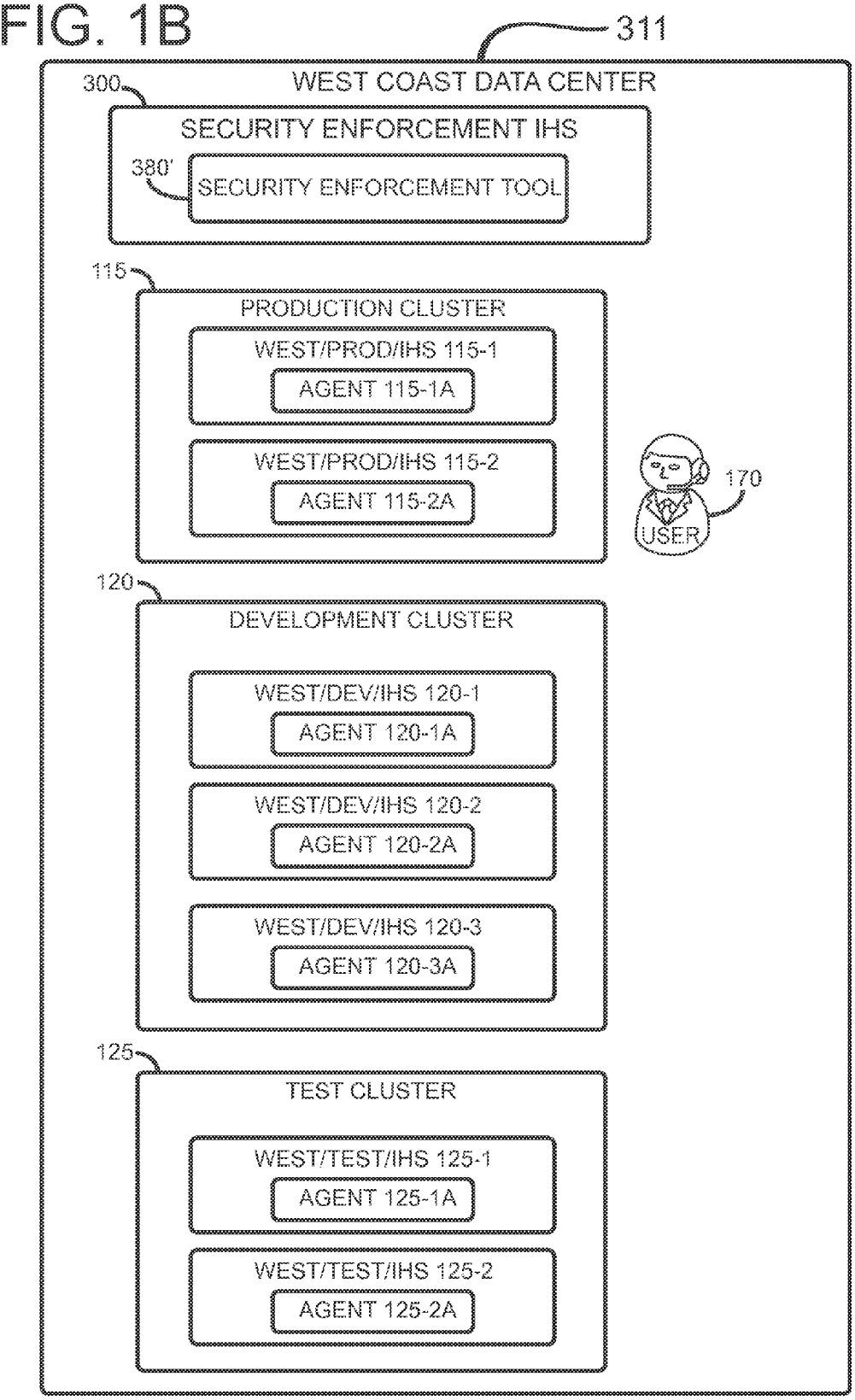
FIG. 1B is a block diagram of a representative data center that the disclosed enterprise network may include.

FIG. 1B is a block diagram that shows more detail with respect to one of the data centers of the enterprise network 100 of FIG. 1A. More specifically, FIG. 1B shows additional detail of west coast data center (WCDC) 311 which is a representative of the data centers of enterprise network 100. Like numbers indicate like elements when comparing the elements of WCDC 311 of FIG. 1B with the elements of WCDC 311 of FIG. 1A. FIG. 1B shows WCDC 311 as including security enforcement IHS 300 as well as production cluster 115, development cluster 120 and test cluster 125. Each of these clusters includes multiple target IHSs onto which users may log on by inputting their respective usernames and passwords. Each of IHSs 115-1A, 115-2A, 120-1A, 120-2A, 120-3A, 125-1A and 125-2A may be a target IHS into which a user may log on. For example, the WEST/PROD/IHS 115-2 is a representative IHS into which a user 170 may log on.

Each target IHS includes an agent tool, i.e. an agent, of the security policy enforcement tool 380' that may run on the target IHS. The agent may serve as an intermediary between the security policy enforcement tool 380' and a runtime TCP/IP stack of the target IHS system. The agent may provide runtime TCP/IP information to the enforcement tool 380'. A user 170 using a desktop IHS, laptop IHS, or portable IHS may log onto the target IHS, or a cluster of IHSs, via link 105 or via network interface controller 207. User 170 logs on with a personal logon ID (user ID) and password that the security policy enforcement tool 380' associates with the security privileges of user 170. A security manager component 405 (see FIG. 4) in security policy administration (SPA) tool 280' accesses a secure database 445 (see FIG. 4) to make user identification and authentication decisions. In one embodiment, the security manager component 405 is a component of SPA tool 280' and the secure database 445 is local to SPA tool IHS 200'. Secure database 445 may store a list of authorized user names and respective access passwords. The agent running on the target IHS may report the user logon and user runtime TCP/IP request to the security policy enforcement tool 380' that may validate user 170's level of authority and level of access to enterprise network 100. Target IHSs may include agents. For example, production cluster 115 includes WEST/PROD/IHS-115-1 that includes agent 115-1A. Production cluster 115 further includes WEST/PROD/IHS 115-2 that includes agent 115-2A. Moreover, development cluster 120 includes WEST/DEV/IHS-120-1 that includes agent 120-1A. Production cluster 115 further includes WEST/DEV/IHS 120-2 that includes agent 120-2A. Production cluster 115 further includes WEST/DEV/IHS 120-3 that includes agent 120-3A. Moreover, test cluster 125 includes WEST/TEST/IHS-125-1 that includes agent 125-1A. Production cluster 115 further includes WEST/TEST/IHS 120-2 that includes agent 125-2A.

Figure 2:
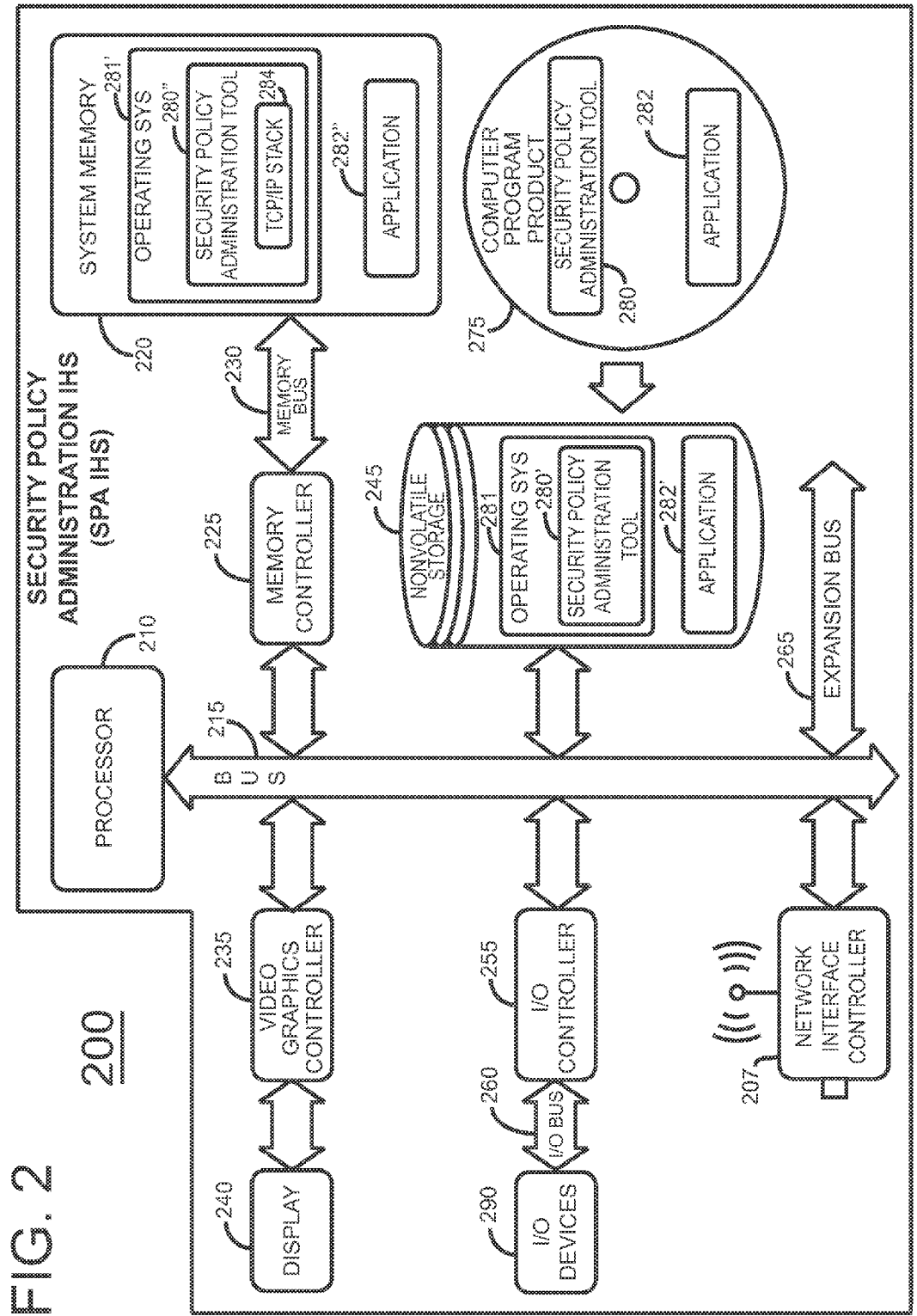
FIG. 2 is a block diagram of a security policy administration (SPA) information handling system (IHS) that the disclosed enterprise network may employ.

FIG. 2 is a block diagram of an information handling system (IHS) that enterprise network 100 may employ as security policy administration IHS (SPA IHS) 200. SPA IHS 200 includes a processor 210 that may include multiple cores. SPA IHS 200 processes, transfers, communicates, modifies, stores or otherwise handles information in digital form, analog form or other form. SPA IHS 200 includes a bus 215 that couples processor 210 to system memory 220 via a memory controller 225 and memory bus 230. In one embodiment, system memory 220 is external to processor 210. System memory 220 may be a static random access memory (SRAM) array and/or a dynamic random access memory (DRAM) array. A video graphics controller 235 couples display 240 to bus 215. Nonvolatile storage 245, such as a hard disk drive, CD drive, DVD drive, or other nonvolatile storage couples to bus 215 to provide SPA IHS 200 with permanent storage of information. I/O devices 290, such as a keyboard and a mouse pointing device, couple to bus 215 via I/O controller 255 and I/O bus 260. One or more expansion busses 265, such as USB, IEEE 1394 bus, ATA, SATA, PCI, PCIE, DVI, HDMI and other expansion busses, couple to bus 215 to facilitate the connection of peripherals and devices to SPA IHS 200.

SPA IHS 200 includes a network interface controller 207 that couples to bus 215 to enable SPA IHS 200 to connect by wire or wirelessly to a network such as link 105 and other information handling systems and network nodes. SPA IHS 200 may take the form of a desktop, server, portable, laptop, notebook, or other form factor computer or data processing system. SPA IHS 200 may take other form factors such as a gaming device, a personal digital assistant (PDA), a portable telephone device, a communication device or other devices that include a processor and memory. SPA IHS 200 may also take the form of a portable, laptop, notebook, gaming device, PDA or any battery-powered device.

SPA IHS 200 may include a computer program product on digital media 275 such as a CD, DVD or other media. In one embodiment, digital media 275 includes an application 282 and a security policy administration (SPA) tool 280. A user may load SPA tool 280 and application 282 on nonvolatile storage 245 as SPA tool 280' and application 282'. Nonvolatile storage 245 may store SPA tool 280' as a separate application or as part of operating system 281, as shown in FIG. 2. When SPA IHS 200 initializes, SPA IHS 200 loads operating system 281 (including SPA tool 280') and application 282' into system memory 220 for execution as operating system 281', SPA tool 280'' and application 282''. Operating system 281', which may include SPA tool 280'', governs the operation of SPA IHS 200. In an alternative embodiment, security policy administration (SPA) tool 280'' may be an application that is separate and distinct from operating system 281'.

Figure 3:
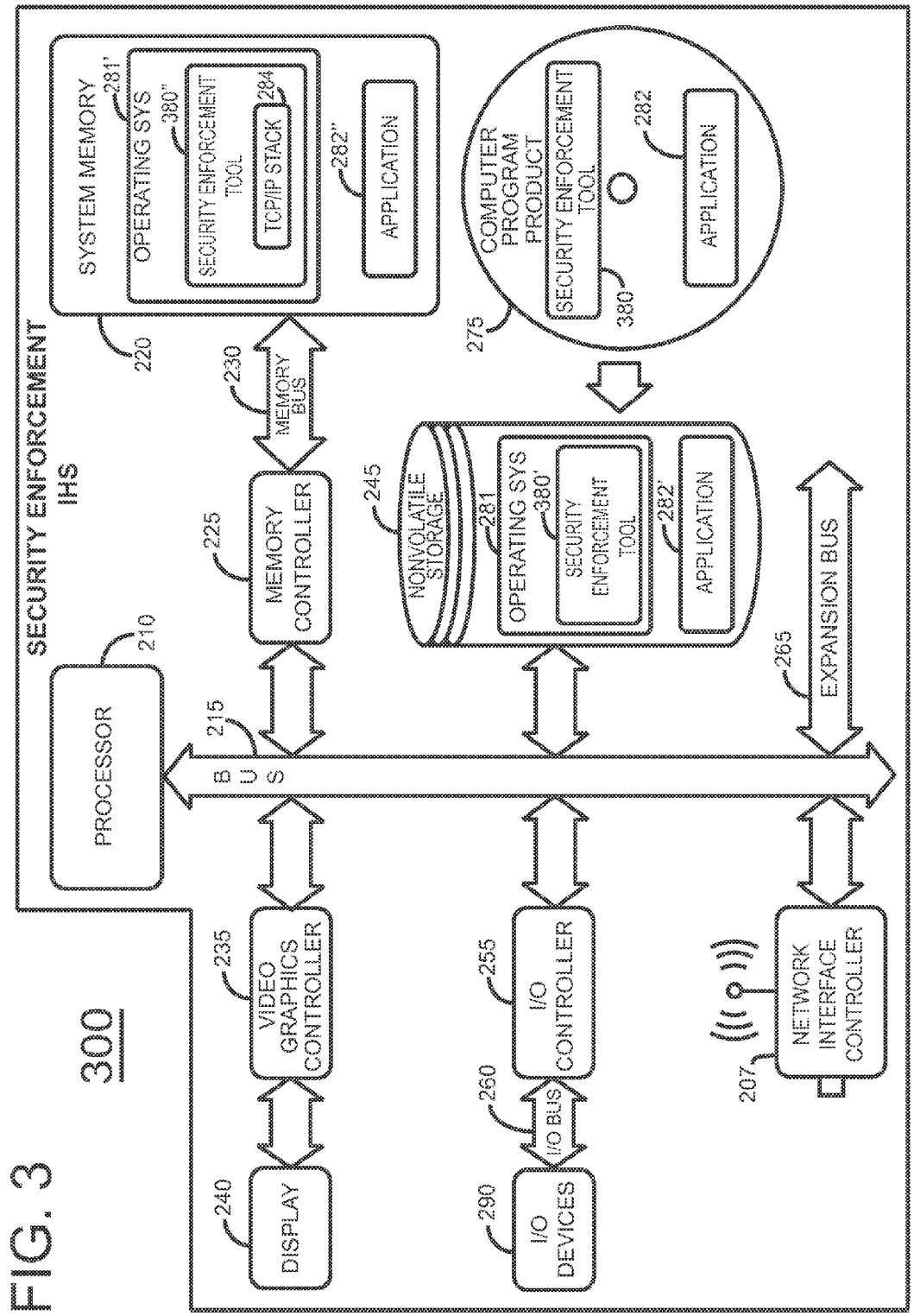
FIG. 3 is a block diagram of a security enforcement IHS that the disclosed enterprise network may employ.

FIG. 3 is a block diagram of an information handling system (IHS) that enterprise network 100 may employ as security IHS 300, security IHS 300', and/or security IHS 300''. Security IHS 300 of FIG. 3 includes many elements in common with SPA IHS 200 of FIG. 2. Like numbers indicate like elements when comparing security IHS 300 of FIG. 3 with SPA IHS 200 of FIG. 2. However, whereas SPA IHS 200 of FIG. 2 includes security policy administration tool 280, security IHS 300 of FIG. 3 includes security enforcement tool 380.

Security IHS 300 may include a computer program product on digital media 275 such as a CD, DVD or other media. In one embodiment, digital media 275 includes an application 282 and a security enforcement tool 380. A user may load security enforcement tool 380 and application 282 on nonvolatile storage 245 as security enforcement tool 380, and application 282'. Nonvolatile storage 245 may store security enforcement tool 380' as a separate application or as part of operating system 281, as shown in FIG. 3. When security IHS 300 initializes, security IHS 300 loads operating system 281 (including security enforcement tool 380') and application 282' into system memory 220 for execution as operating system 281', security enforcement tool 380'' and application 282''. Operating system 281', which may include security enforcement tool 380'', governs the operation of security IHS 300. In an alternative embodiment, security enforcement tool 380'' may be an application that is separate and distinct from operating system 281'.

Figure 4:
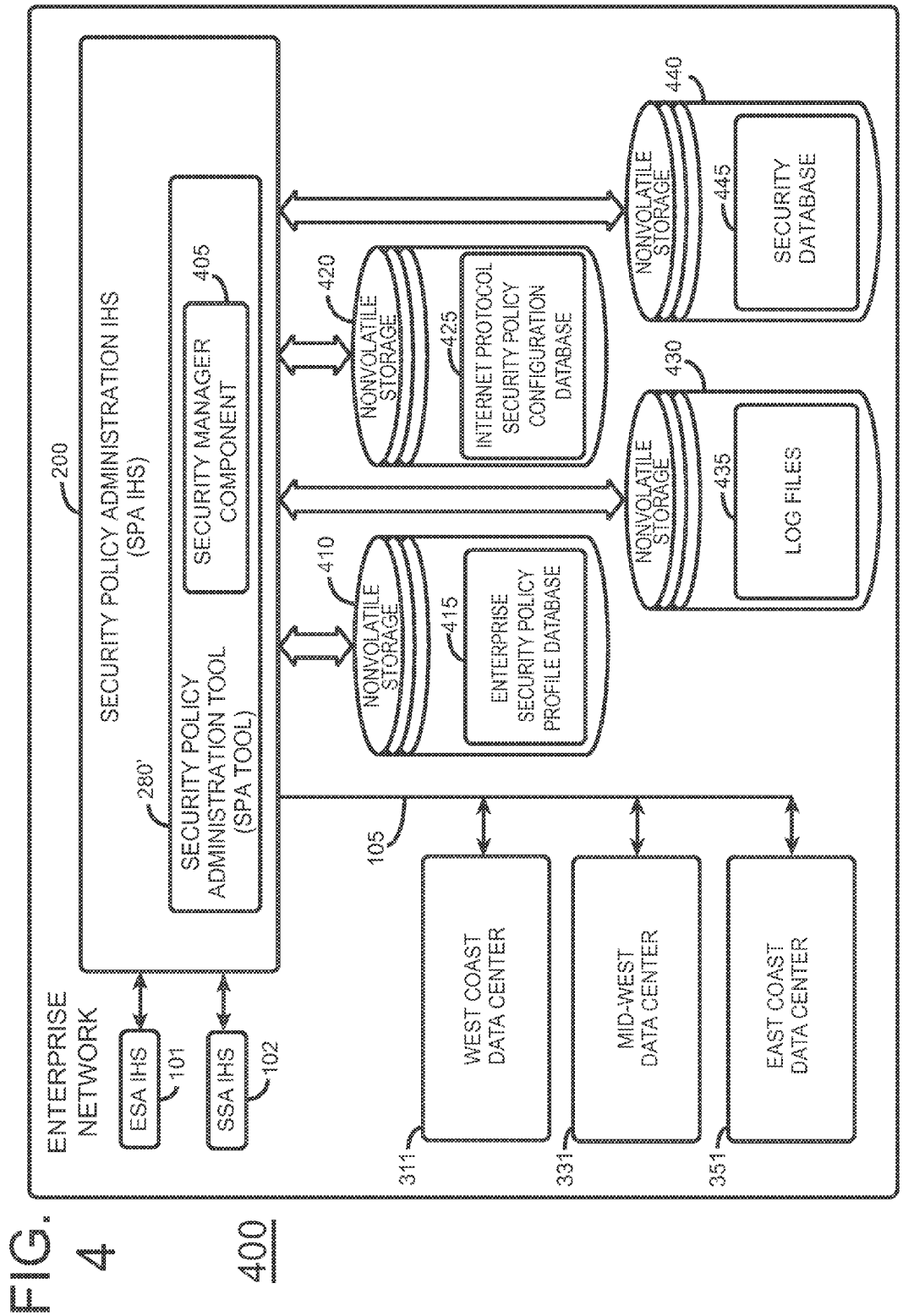
FIG. 4 is a block diagram of another embodiment of the disclosed enterprise network.

FIG. 4 is a block diagram of an enterprise network 400 that is a variation of the disclosed enterprise network 100. Like numbers indicate like elements when comparing enterprise network 400 of FIG. 4 with enterprise network 100 of FIG. 1. Security administrators may use tools that enterprise network 100 provides to administer, deploy and/or validate security policies throughout the enterprise. Enterprise network 100 is a closed security administration system, wherein closed refers to the authorized administration of security policies that occurs only through the security administration system and any alteration of the security policies outside the security administration system is detectable. The top level security administrator, namely enterprise security administrator ESA, may access enterprise network 100 via ESA IHS 101. Subordinate security administrators, i.e., SSA-1 and/or SSA-2, may access enterprise network 100 via SSA IHS 102. SPA IHS 200 hosts security policy administration tool 280' which generates a security policy configuration and deploys the security policy configuration within enterprise network 100. Security policy administration tool 280' provides services that support the closed security policy administrative system that enterprise network 400 provides. Enterprise network 400 includes multiple tier levels of administrators including enterprise security administrator ESA and subordinate security administrators SSA-1 and/or SSA-2, and may include multiple users of IHSs in WCDC 311, MWDC 331, and ECDC 351 which couple to SPA IHS 200 via link 105. Security policy administration (SPA) IHS 200 couples to nonvolatile storage 410 which stores the enterprise security policy profile database 415, and also to nonvolatile storage 420 which stores Internet protocol security policy configuration database 425, and nonvolatile storage 430 which stores log files 435. Security policy administration (SPA) IHS 200 also couples to nonvolatile storage 440 which stores the enterprise security database 445.

Enterprise security profile database 415 stores the security policy rule profiles that the SPA tool 280' uses to determine which administrators are authorized to manage security policy rules. Internet protocol security policy configuration database 425 stores the policies configured by the security administrator and deployed in enterprise network 100 and/or enterprise network 400. Log files 435 stores log files of notifications of mismatches between the installed policy on a target IHS and the saved policy in the Internet protocol security policy configuration database 425. Alternatively, log files may be stored in the memory of security enforcement IHS 300, 300' and/or 300" and periodically transferred to log files 435 in nonvolatile storage 430. While FIG. 4 shows nonvolatile storages 410, 420 and 430 located externally to security policy administration IHS 200, these nonvolatile storages may alternatively be internal to security policy administration HS 200. Enterprise security administrator ESA and subordinate security administrators SSA-1 and/or SSA-2 may perform network security policy configuration within the closed security policy administrative system that enterprise network 400 provides.

The flowchart of FIG. 5 shows the operation of the security policy administration (SPA) tool 280' in the closed administrative system of enterprise network 100. Operation commences with start block 510. A particular security administrator, for example the ESA or SSA-1 or SSA-2 or other security administrators, requests the SPA tool 280' operating on the security policy administration (SPA) IHS 200 to create a network IP security policy configuration for the IHSs in enterprise network 100, as per block 520. The SPA tool 280' receives the request from a security administrator to generate a security administration action, as per block 525. The SPA tool 280' requests that a security manager component 405 in SPA tool 280' determine if the administrator holds the proper level of authority to perform the security administration action, including "create" (AddRule), "delete" (DeleteRule), or "modify" (ResolveSymbolic) actions for the network security policy rule of the target IHS or cluster of IHSs in the WCDC 311, and/or the MWDC 331, and/or the ECDC 351, as per block 530. The SPA tool 280' may test to determine if the particular security administrator holds the proper level of authority to perform the administrative action of generating a security policy rule profile, as per block 535.

If the SPA tool 280' does not permit an administrative action, then the SPA tool 280' in security policy administration IHS 200 rejects the non-permitted administrative action, as per block 537. The SPA tool 280' may log the non-permitted administrative action to the log files 435 in nonvolatile storage 430, as per block 539 and the process terminates at end block 570. However, if the SPA tool 280' permits an administrative action, then the SPA tool 280' generates a Network Security Policy Configuration, as per block 540. A policy is a set of one or more rules that dictate how security is to be enforced on an IHS. A Network Security Policy Configuration is defined as a set of policy rules configured by an administrator which dictate how network security policy is enforced on network traffic that is handled by an IHS. Such a policy consists of a set of policy rules, where each rule includes a set of conditions (e.g. IP addresses, ports, and protocols) and actions (e.g. block the traffic (deny), allow the traffic (permit) or permit the traffic if it is protected by a cryptographic network security protocol (e.g. IPSec). An enterprise security policy profile is defined as a network security policy configuration stored on the administrative system as the policy of record that is deployed to IHSs.

SPA tool 280' may save the Network Security Policy Configuration in the Internet Protocol Security Policy Configuration Database 425 in nonvolatile storage 420, as per block 542. The SPA tool 280' sends the Network Security Policy Configuration to the target IHSs, and/or target IHS and/or target clusters of IHSs in the WCDC 311, and/or the MWDC 331, and/or the ECDC 351 of enterprise network 100. The target IHSs read and install the network IP security policy configuration into their respective TCP/IP stacks by agents, namely agent 115-1A, agent 115-2A, agent 120-1A, agent 120-2A, agent 120-3A, agent 125-1A, and agent 125-2A, resulting in an installed IP Security Filter Policy in the target IHS, as per block 547. The target IHSs enforce the IP Security Filter Policy on users of the target IHSs. The process ends with end block 570.

Once the SPA tool 280' generates a network security policy and deploys the policy to the target IHSs in enterprise network 100, the SPA tool 280' verifies that the deployed policy actually matches the policy that the SPA tool 280' defined. The SPA tool 280' also verifies that the proper level of administrator (namely ESA or SSA-1, or SSA-2) ultimately defined the policy. This verification ensures that no one has applied unauthorized changes to the active security policy from outside of the security policy administration system that enterprise network 100 provides, for example, by a direct configuration file edit or by a command line interface. An agent tool (shown as agents, namely agent 115-1A, agent 115-2A, agent 120-1A, agent 120-2A, agent 120-3A, agent 125-1A, and agent 125-2A) of the SPA tool 280' may run on the target IHS in enterprise network 100. The agents, namely agent 115-1A, agent 115-2A, agent 120-1A, agent 120-2A, agent 120-3A, agent 125-1A, and agent 125-2A on the target IHS communicates to SPA IHS 200 the current runtime network security policy which it periodically reads directly from the system run-time TCP/IP stack, for example TCP/IP stack 284 in IHSs in WCDC 311, and/or MWDC 331, and/of ECDC 351, to the SPA tool 280'. The agent tool also compares the policy with the network security policy stored in the Internet protocol security policy configuration database 425. The SPA tool 280' may send an alert to an authorized security administrator and/or security officer when the SPA tool 280' detects a mismatch between a deployed policy and a policy read from a targeted IHS. The SPA tool 280' in the security policy administration IHS 200 may verify a correct configuration of a resource, or detect an incorrect configuration of a resource, by the security administrator. The SPA tool 280' in the security policy administration IHS 200 may periodically communicate with its target IHS agent tool to receive the IHSs TCP/IP stack (Security Configuration Enforcement Point) to verify that a policy condition covers the set of defined active IP addresses and TCP/UDP ports. For instances not covered by the policy, the SPA tool 280' in the security policy administration system may log a mismatch to the log files 435. The SPA tool 280' in the security policy administration system may alert the ESA of non-compliant and/or misconfigured IHSs.

The SPA tool 280' resides in the SPA IHS 200 and may include several components, namely an agent, an authorization checking component, a security manager component 405, and a validation component. Referring to FIG. 1B, an agent may reside in each IHS of the production cluster 115, the development cluster 120, and the test cluster 125. The security enforcement tool 380' resides in the security enforcement IHS 300. The agents, namely agent 115-1A, agent 115-2A, agent 120-1A, agent 120-2A, agent 120-3A, agent 125-1A, and agent 125-2A, serve as an intermediaries between the run time TCP/IP stack of the IHS in which they reside and the security enforcement tool 380'. An authorization checking component, security manager component 405 and a validation component reside within SPA tool 280' on SPA IHS 200.

The flowchart of FIG. 6 shows the operation of the SPA tool 280' monitoring and validating function. Once the security policy administration tool 280' generates a configuration, the validation component of the security policy administration tool 280' verifies that the policy deployed throughout enterprise network 100 matches the generated configuration. Operation commences with start block 610. The SPA tool 280' polls the installed IP Security Filter Policies in the target IHSs of the WCDC 311, MWDC 331, and ECDC 351 in enterprise network 100, as per block 620. The SPA tool 280' compares the installed policies on target IHSs with the policies saved in the Internet protocol security policy configuration database 425 in nonvolatile storage 420. If the security policies of the target IHS match the security policies of the Internet protocol security policy configuration database 425, then the target IHS exhibits the proper policy configuration and control transfers to block 630. However, if in block 625 the target IHS does not employ the policy configuration that the SPA tool 280' delivered, then the SPA tool 280' logs the policy mismatch in log files 435 of nonvolatile storage 430, as per block 635, and control transfers to block 630. SPA tool 280' counts down a time interval to the next polling event, as per block 630. SPA tool 280' tests to determine if polling should continue, as per block 640. The criteria for this test are based on a configured polling time interval or a default polling time interval. If the SPA tool 280' continues polling then control transfers to block 620 and polling continues. If polling should not continue then polling stops with end block 650.

A tiered level of administration is the hierarchical level associated with a particular security administrator or particular group of security administrators. Enterprise network 100 employs security administrators at different tier levels of administration within a hierarchy of security administrators. Security administrators at higher tier levels in the administrative hierarchy exhibit higher authority with respect to actions that they may authorize for the IHS groups and network users that they administer. For example, the enterprise security administrator (ESA) exhibits the highest tier level in enterprise network 100 and/or enterprise network 400. Security administrators SSA-1 and SSA-2 exhibit a next tier level of administration below the tier level of the ESA, namely the highest tier. Security administrators SSA-1 and SSA-2 are subordinate to the enterprise security administrator ESA. It is possible to employ other security administrators at other tiers below the tier level of security administrators SSA-1 and SSA-2. For example, another tier level of administration may exist within a particular cluster of IHSs, such as within development cluster 120 or other IHS cluster or IHS group. The ESA and/or an SSA may assign a particular security administrator to such a tier level below the tier level of the SSA. Particular security administrators may include Admin1, Admin2, Admin3, and so on. Admin1, for example may perform the role of the ESA, and Admin2 may perform the role of SSA-1, and Admin3 may perform the role of SSA-2.

The network user identification and associated password identify the authority level of the Admins and of network users. An Admin or a network user may log into an IHS anywhere in enterprise network 100/400. The SPA tool 280' via the authorization checking component verifies and validates the user log-on and user privileges and security tier against the enterprise security policy profiles in enterprise security profile database 415.

Network users who are not specifically security administrators or security personnel may operate network user IHSs (not specifically shown) which may connect within enterprise network 100 and/or enterprise network 400. A user IHS (not specifically identified in enterprise network 100/400) may take the form of a desktop, server, portable, laptop, notebook, or other form factor computer. Network users may gain access to enterprise network 100 and/or enterprise network 400 via communication link 105, and/or a network interface controller included within a data center such as WCDC 311, MWDC 331, and/or ECDC 351. The data center may include provisions for secured network connections, including secured dial-up modems and/or secured external Internet connections through secured gateways, including security IHS 300, 300', 300", and other security gateways not specifically shown, and/or network interface controllers exemplified by network interface controller 207. Security administrators may control network user access and network user security policies via SPA tool 280'.

The highest tier level of administration for a group of IHSs sets up a global policy rule set that applies to all IHSs within the group. In other words, the ESA sets up the global policy rules for enterprise network 100 and may store the rules in the enterprise security policy profile database 415 in nonvolatile storage 410 of the security policy administration system. In one embodiment, from the viewpoint of the ESA, the group includes all IHSs in enterprise network 100 or enterprise network 400. The global policy rules may exhibit a global policy rule format that may include specific values for network resources (e.g., IP addresses), and/or specific values for traffic descriptors (e.g., ports and protocols). In one embodiment, lower tier administrators (i.e., SSA-1 and/or SSA-2) may not change the mandatory specific values for these network resources and/or traffic descriptors, whereas the ESA may change these values. The global policy rule format may also include symbolics for network resources and/or for traffic descriptors. Lower tiered administrators (i.e., SSA-1 and/or SSA-2, and/or Admin2, Admin5, etc.) may replace symbolics either manually by or via programming tools with information from topology databases before the rule becomes active on the target IHS. Global policy rules include specific valued actions which may indicate a mandatory action (i.e., permit, deny, or permit with IPSec). Global policy rules may also include symbolics. A lower tiered administrator (i.e., SSA-1 and/or SSA-2) may activate a rule by changing a symbolic to a mandatory action. The SPA tool 280' may authorize a lower tiered policy administrator to replace a symbolic in the policy rule through the enterprise security policy profile database 415 in nonvolatile storage 410 of the security policy administration system that enterprise network 100/400 provides.

The SPA tool 280' in enterprise network 100/400 may create the security policy rule profiles as the global policy rule set is defined in the enterprise security policy profile database 415 in nonvolatile storage 410. The security police rule profile name set is automatically created during the process of defining the actual policy rules based on the naming policy. A special security policy rule profile naming policy may govern the resource profile creation. A special security policy rule profile naming policy may simplify the definition of the security policy rule profiles and may ensure accurate creation of the security policy rule profiles.

For example, the naming policy may specify creation of rules added to the Security Policy Rule Profile Set as including various combination of the levels shown in TABLE 1.

TABLE 1

Symbolic Level
AdminAction Level
Rule Level
IHS Level
IHS Group Level
Policy Type Level A Security Policy Rule Profile Naming Policy specified with one or more of the settings in TABLE 1 may indicate the scope of automatically created security policy rule profile. For example, if the SPA tool 280' specifies only a Policy Type Level, the SPA tool 280' in the security policy administration system may create only one Security Policy Rule Profile exemplified by:

IPSec.*.*.*.*.*.*

In one embodiment, a customizable policy configuration may include a naming policy that includes combinations of levels, wherein the levels include at least one of the levels of TABLE 1, namely a Symbolic Level, an AdminAction Level, a Rule Level, an IHS Level, an IHS Group Level, a Policy Type Level. At least one of the levels may include the wildcard level that governs automatic creation of the customizable security policy rule profile name or names.

In another example, if the SPA tool 280' of enterprise network 100/400 specifies Policy Type, IHS Group, and AdminAction Levels, then SPA tool 280' may create multiple security policy rule profiles whenever conditions require a unique Security Policy Rule Profile for the specified scope as shown in TABLE 2 below.

TABLE 2

IPSec.MidWest.*.*AddRule
IPSec.MidWest.*.*DeleteRule
IPSec.EastCoast.*.*.AddRule The enterprise security policy profile database 415 may include a set of security policy rule profiles that control an administrative user's permission to access and to add or delete a rule.

TABLE 3 shows examples of security profiles that may reside in the enterprise security policy profile database 415 in nonvolatile storage 410. The naming convention follows the naming of IHSs of enterprise network 100 shown in FIG. 1. In TABLE 3 the asterisk "*" character represents a wildcard, that is, a segment of the security profile name space that does not have to match the input search argument.

TABLE 3

| | |
|---|---|
| A | IPSec.*.*.*.*.*.* |
| B | IPSec.EastCoast.Production.IHS1.Rule10.ResolveSymbolic.LocalTrafficDescriptor |
| C | IPSec.EastCoast.Production.*.*.*.* |
| D | IPSec.WestCoast.*.*.*.*.* |
| E | IPSec.*.Production.*.PermitWeb.ResolveSymbolic.RemoteNetworkGroup |
| F | IPSec.WestCoast.Test.MailPermit.* |
| G | IPSec.MidWest.Test.*.AddRule |
| H | IPSec.MidWest.*.*.*.*.* |

In the example security profiles of Table 1, the security policy administration (SPA) tool 280' may authorize specific security administrators (Admin1, Admin2, and so on) to make specific changes to specific profiles, as for example in TABLE 4 below. Security administrators Admin1, and/or Admin2, and/or Admin3, and/or Admin4, and/or Admin2, and/or Admin6, and/or Admin7 may be subordinate security administrators exemplified by SSA-1 and SSA-2 in FIG. 1.

TABLE 4

| | |
|---|---|
| Admin1 | security policy A |
| Admin2 | security policy B |
| Admin4 | security policy C |
| Admin2, Admin3 | security policy D |
| Admin5 | security policy E |
| Admin7 | security policy F |
| Admin6 | security policy G |
| Admin5 | security policy H |

The enterprise security policy profile database 415 may include a set of security policy rule profiles that control an administrative user's permission to access and to add or delete a rule. An administrative user is another name for a security administrator such as the ESA, SSA-1 and SSA2. Security policy rule profiles may appear in the enterprise security policy profile database 415 in nonvolatile storage 410. A security policy rule profile that, for example, controls access to the administrative actions of resolving a LocalTrafficDescriptor symbolic Rule10 in an IPSec policy for East/Prod/IHS 155-1 in production cluster 155 of ECDC 351 may be named:

IPSec.Enterprise.ECDC.Production.IHS155-1.Rule10.*.ResolveSymbolic. LocalTrafficDescriptor.*

An authorized security administrator, i.e. an authorized administrative user, with write permission to this resource profile may change the symbolic LocalTrafficDescriptor to an unspecified value.

The SPA tool 280' may name a Security Policy Rule Profile that controls access to the LocalTrafficDescriptor attribute for any rule in the IPSec policy for any system in the East Coast Data Center:

IPSec.Enterprise.EastCoast.Production.*.*.ResolveSymbolic.LocalTrafficDescriptor.*

In one embodiment, the SPA tool 280' may name a Security Policy Rule Profile that controls access to all administrative actions for all rules in the IPSec policy for any system in the East Coast Data Center:
IPSec.Enterprise.EastCoast.Production.*.*.*.*.*
The SPA tool 280' may name a Security Policy Rule Profile that controls access to an administrator action to "delete Rule10" in the IPSec policy for East/Prod/IHS-155-1 in the East Coast Data Center ECDC 351:
IPSec.Enterprise.EastCoast.Production.IHS-155-1.Rule10.*.DeleteRule
The SPA tool 280' may name a Security Policy Rule Profile that controls access to an administrator action to "delete any rule" that includes a web application traffic descriptor in the IPSec policy for any system in the East Coast Data Center:
IPSec.Enterprise.EastCoast.Production.sys1.*.*.*.Web ApplicationLocalTraffic.*..*. DeleteRule
The SPA tool 280' may name a Security Policy Rule Profile that controls access to an administrator action to add any rule that includes a web application traffic descriptor in the IPSec policy for any system in the East Coast Data Center:
IPSec.Enterprise.EastCoast.Production.sys1.*.*.*.Web ApplicationLocalTraffic.*..*. AddRule
If the SPA tool 280' allows an administrator to add any rule to the East Coast Data Center except one for web application traffic, a pair of Security Policy Rule Profiles may be named as follows:
IPSec.Enterprise.EastCoastProducation.sys1.*.*.*..*.*.*. Addrule
IPSec.Enterprise.EastCoast.Production.sys1.*.*.*.Web ApplicationLocalTraffic.*. *.AddRule
In this above rule, no user may be permitted to the second Security Policy Rule Profile that includes "WebApplicationLocalTraffic".

Security Policy Rule Profiles control a security administrator's and/or network user's ability to change an attribute in the context of a rule, for example, a traffic descriptor for a rule that controls web traffic. SPA tool 280' performs authorization checks as discussed in more detail below. SPA tool 280' includes multiple components including an authorization checking component (not separately shown) that performs authorization checks. In one embodiment, the authorization checking component in SPA tool 280' is the Resource Access Control Facility (RACF) available from the IBM Corporation. The authorization checking component checks the authorization of a particular user, such as a security administrator, to access and control a group of IHSs. SPA tool 280' requests that the authorization checking component perform these authorization checks.

In more detail, prior to allowing a security administrator to change a symbolic attribute in a rule, SPA tool 280' calls the authorization checking component with a fully formed Security Policy Rule Profile including all name elements specified (i.e. PolicyName.IHSGroupName(s)/IHSName.RuleIdentification.AdminAction). SPA tool 280' selects the closest name match, including any wildcarding, to the Security Policy Rule Profile from the security policy profile database 415 in nonvolatile memory 410. For example, if SPA tool 280' does not find a Security Policy Rule Profile that matches
 LocalNetworkResource1.WebTrafficDescriptor.
"180.12.10.0/24".TCP80
then SPA tool 280' marks the rule as an "access denied" condition. The SPA tool 280' checks the security administrator's user identity permission level to validate the authority of the security administrator to change the resource attribute on a rule for the matched rule profile. The SPA tool 280' may limit and/or restrict operation of a particular target IHS if the installed policy configuration for the particular target IHS does not match the stored policy configuration in the internet protocol security policy configuration database 425. The SPA tool 280' may disallow the policy customization request from the security administrator if the security administrator's user identity permission level lacks a valid authority to customize the policy.

The Security Policy Rule Profile Name includes a concatenation of name elements where any of the name elements may be "wildcarded". More particularly, a customizable policy configuration is represented by one or more security policy rule profile names that include a concatenation of name elements wherein at least one of the name elements includes a "wildcarded" name element. In one embodiment, the "wildcarded" name element replaces a specific value local to the target IHS within a particular data center. An example of a Security Policy Rule Profile Name is:

PolicyName.IHSGroupName(s).IHSName.RuleIdentification.AdminAction

Access control applies to the rule, or set of rules, that include collectively the element names PolicyName, IHSGroupName(s), IHSName and RuleIdentification. A specific name in each of these name elements specifies one specific rule. When any name of the above elements is "wildcarded" by using the asterisk *, that Security Policy Rule Profile may represent multiple rules. The IHSGroupName(s) may include one or more descriptors defining a logical IHS grouping and/or clusters of IHSs. Security administrators define the clusters for their domain of IHSs. TABLE 5 provides examples of name elements together with respective name element meanings.

TABLE 5

| | |
|---|---|
| PolicyName | Policy category such as IP Security, IP filtering. |
| IHS GroupName | IHS cluster (e.g., Test Cluster 125, production cluster 155) |
| IHSName | An IHS (e.g., West/Test/IHS 125-1, East/Prod/IHS 155-2) |
| RuleIdentification | A RuleName and/or RuleConditionAttributes. RuleConditionAttributes, or both as part of the Security Policy Rule Profile. . |
| AdminAction | Action(s) allowed to the administrator, may include: AddRule, DeleteRule, ResolveSymbolic. |

Referring to TABLE 5, the RuleIdentification name element refers to either a RuleName and/or RuleConditionAttributes. The network security policy rules in the enterprise security policy profile database 415 define the attributes corresponding to the RuleConditionAttributes (described below). The Security Policy Rule Profile in the enterprise security policy profile database 415 may include the RuleName and/or RuleConditionAttributes name elements.

The SPA tool 280' in the Security Policy Administration System may generate a static value for a RuleName. The SPA tool 280' in the Security Policy Administration System may also generate a "wildcarded" value for a RuleName, in which case the SPA tool 280' specifies the RuleConditionAttributes values, (mandatory and/or symbolic combinations) that together form the rule condition. The associated policy type for the rule defines the RuleConditionAttributes of the rule. For example, in the case of IP Security Policy rules the SPA tool 280' may define rule attributes according to TABLE 6.

TABLE 6

| | |
|---|---|
| LocalNetworkResource | may include an IP address, subnet, or network prefix specification on the target IHS |
| LocalTrafficDescriptor | may include a TCP or UDP port and TCP/IP protocol on the target IHS. |
| RemoteNetworkResource | may include an IP address, subnet, or network prefix for an IHS(s) other than the target IHS. |
| RemoteTrafficDescriptor | may include a TCP or UDP port and TCP/IP protocol for an IHS(s) other than the target IHS. |

A period, ".", separates the attributes specified in a Security Policy Rule Profile. A wildcard character, such as the asterisk "*" may represent wildcarded elements. The following example shows a combination of mandatory and symbolic conditions of RuleConditionAttributes and RuleIdentificationName that together correspond to a policy rule condition. An example rule condition specified at the global level may take the following form.
LocalNetworkResource1.WebTrafficDescriptor.
"180.12.10.0/24".*

In the above example "LocalNetworkResource1" represents a symbolic value for the "LocalNetworkResource" attribute. "WebTrafficDescriptor" represents a symbolic value for a "LocalTraffic" descriptor. "108.12.10.0/24" represents a mandatory value of a "RemoteNetworkResource" attribute (i.e., a specific IP subnet address). The wildcard character asterisk, "*" indicates "any" value to represent a "RemoteTrafficDescriptor" attribute.

Referring to TABLE 5 above, the "AdminAction" name element may include the actions "resolve symbolic values", "delete a rule", and "add a rule". Administrative access control applies the rule to the symbolic portion of the name element ResolveSymbolic. A security administrator authorized to the AdminAction attribute may change the attributes of ResolveSymbolic. For example, referring to FIG. 1, the ESA may authorize the SSA-1 via the AdminAction attribute to change ResolveSymbolic attributes for IHSs and/or clusters within the authority of the SSA-1. The upper tier level ESA may authorize the subordinate tier level SSA-1 to administer greater control over a subordinate level (IHS and/or cluster of IHSs) under the jurisdiction of SSA-1. The attributes of the element name ResolveSymbolic may include:
 ResolveSymbolic.LocalNetworkResource,
 ResolveSymbolic.LocalTrafficDescriptor,
 ResolveSymbolic.RemoteNetworkResource,
 ResolveSymbolic.RemoteTrafficDescriptor, and/or
 ResolveSymbolic.PolicyAction.

Once a security administrator with authorization for a particular tier level of security administration performs all permitted network security policy configuration, the SPA tool 280' of enterprise network 100/400 may enable several possible actions:
 1) Forward the policy to the next higher tier or level of administration if, for example, the policy requires further customization before the SPA tool 280' activates the policy, or if the policy requires a signoff by an higher tier level security administrator, i.e. a higher tier level administrative supervisor.
 2) The SPA tool 280' may store the policy on the target IHS and/or cluster of IHSs for policies eligible for activation (i.e., customizations complete and approved)
 3) Activate the policy on the target IHS and/or cluster of IHSs for runtime use.

The SPA tool 280' in the enterprise network 100/400 may support a Security Policy Rule Profile name that adds an additional name element which specifies an actual value. Moreover, a companion wildcard rule may define a name not permitted to any user. For example:
 ResolveSymbolic.LocalTrafficDescriptor.TCP80
 where "TCP80" carries the meaning "TCP port 80". The SPA tool 280' may define a companion wildcarded rule:
 ResolveSymbolic.LocalTrafficDescriptor.*
These example rules reject as "not permitted" an attempt to, for example, configure port 81.

In another embodiment, the Security Policy Rule Profile name may include a customizable mapped name. For example the SPA tool 280' may use a value of "WebServerPort" instead of the specific value "TCP80" for either LocalTrafficDescriptor or RemoteTraffic Descriptor. The name "WebServerPort" may include a group of one or more protocol/port pairs that the SPA tool 280' permits as allowed values. The SPA IHS 200, prior to building the Security Policy Rule Profile name for the Security Policy Rule Profile name authorization check, may map the name "TCP80" to the mapping name "WebServerPort" and construct a Security Policy Rule Profile with the mapped name instead of the actual value. This method of mapping may require fewer Security Policy Rule Profile names to support a given configuration in the enterprise. The SPA tool 280' may also apply a mapping method for IP addresses by mapping 192.168.3.1 to "WirelessAccessPoint3" for example.

The SPA tool 280' may use Security Policy Rule Profile names to control access to LocalTrafficDescriptor, RemoteTrafficDescriptor, LocalNetworkResource, and/or RemoteNetworkResource groups. For example, the SPA tool 280' may use profile name mapping to control access for creating and modifying the mapping of name groups. In profile name mapping, SPA tool 280' may, for example, map "WCDCtest" to "West/Test/IHS125-1 and West/Test/IHS125-2". The SPA tool 280' may specify the resource profile names for adding a specific value to a traffic descriptor, for example as:
PolicyName.IHSGroupName(s).IHSName.NameGroup,
MappingName
The element NameGroup may include
 LocalNetworkResourceGroup
 LocalTrafficDescriptorGroup
 Remote NetworkResourceGroup
 RemoteTrafficDescriptorGroup
For example the SPA tool 280' may use the Security Policy Rule Profile name:
IPSec.EastCoastDataCenter.Sys1.LocalTrafficDescriptor
Group.WebServerPort
to control access to the WebServerPort mapping name.

The "DeleteRule" name element represents a delete action for a rule. In one embodiment, the rule to which the DeleteRule name element applies precedes the DeleteRule name element. The "AddRule" element name represents an add action for a rule or rules. The rule to which the AddRule name element applies precedes the AddRule name element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, blocks, operations, elements, and/or components, but do not preclude the presence or addition of one or more other features, integers, steps, blocks, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, those skilled in the art will appreciate that the logic sense (logic high (1), logic low (0)) of the apparatus and methods described herein may be reversed and still achieve equivalent results. The embodiment was chosen and described in order to best explain the principles of the invention and the practical application, and to enable others of ordinary skill in the art to understand the invention for various embodiments with various modifications as are suited to the particular use contemplated.

We claim:

1. A method, comprising:
   providing, at a security policy administration (SPA) information handling system (IHS) in an enterprise network, a security policy administration (SPA) tool that is responsive to a first tier level security administrator and a plurality of second tier level security administrators, wherein the plurality of second tier level security administrators are subordinate to the first tier level security administrator;
   providing, at data centers, respective security enforcement IHSs, wherein the security enforcement IHS at each data center includes a respective security enforcement tool;
   receiving, by the SPA tool, a policy generation request from a first user;
   testing, by the SPA tool, to determine if the first user is an authorized first tier level security administrator;
   generating a policy, by the SPA tool, in response to the policy generation request if the first user is determined to be an authorized first tier level security administrator, wherein the generating of the policy includes:
      generating, by the SPA tool, a first policy configuration that is customizable by an authorized second tier level security administrator, thus providing a first customizable policy configuration;
      storing, by the SPA tool, the first customizable policy configuration in a policy configuration database;
      transmitting, by the SPA tool, the first customizable policy configuration to a target IHS within a particular data center;
   receiving, by the SPA tool, a policy customization request from a second user;
   testing, by the SPA tool, to determine if the second user is an authorized second tier level security administrator; and
   modifying, by the SPA tool, the stored first customizable policy configuration as requested in the policy customization request of the second user if the second user is determined to be an authorized second tier level security administrator.

2. The method of claim 1, further comprising:
   testing, by the security enforcement tool in a particular data center, to determine if an installed policy configuration in a particular target IHS matches the stored policy configuration in the policy configuration database.

3. The method of claim 2, further comprising:
   limiting, by the security enforcement tool, operation of the particular target IHS if the installed policy configuration does not match the stored policy configuration in the policy configuration database.

4. The method of claim 1, further comprising:
   disallowing, by the SPA tool, the policy customization request from the second user if the second user is determined to not be an authorized second tier level security administrator.

5. The method of claim 1, further comprising:
   allowing access, by the security enforcement tool, of a third user to the target IHS in accordance with the policy configuration applicable to the target IHS, wherein the third user is a user other than a first tier level security administrator and a plurality of second tier level security administrators.

6. The method of claim 1, wherein the first customizable policy configuration includes a customizable mapped name in at least a portion of the first customizable policy configuration, the customizable mapped name taking the place of a specific value wherein an authorized second tier level security administrator customizes the customizable mapped name with a specific value local to the target IHS within a particular data center.

7. The method of claim 2, wherein the target IHS within a particular data center includes an agent tool for monitoring the installed filter policy in the target IHS, the method further comprising:
   reporting, by the agent tool, to the security enforcement tool the installed filter policy of the target IHS, and
   enforcing, by security enforcement tool, the installed filter policy on the target IHS.

8. The method of claim 6, wherein the first customizable policy configuration is represented by one or more security policy rule profile names which include a concatenation of name elements wherein at least one of the name elements includes a wildcarded name element, wherein the wildcarded name element replaces a specific value local to the target IHS within a particular data center.

9. The method of claim 6, wherein the first customizable policy configuration includes a naming policy including combinations of levels, the levels including at least one of a Symbolic Level, an AdminAction Level, a Rule Level, an IHS Level, an IHS Group Level, a Policy Type Level, and wherein at least one of the levels includes the wildcard level that governs automatic creation of the first customizable security policy rule profile name or names.

10. The method of claim 6, wherein the SPA tool uses the first customizable security policy rule profile name to control access to the first customizable mapped name by the second tier level security administrator.

11. An enterprise network, comprising:
   a plurality of data centers each including respective security enforcement information handling systems (IHS), wherein the security enforcement IHS at each data center includes a respective security enforcement tool;
   a security policy administration (SPA) IHS that includes a security policy administration (SPA) tool that is responsive to a first tier level security administrator and a plurality of second tier level security administrators, wherein the plurality of second tier level security administrators are subordinate to the first tier level security administrator, wherein the SPA tool:
      receives a policy generation request from a first user;
      tests to determine if the first user is an authorized first tier level security administrator; and
      generates a policy in response to the policy generation request if the first user is determined to be an authorized first tier level security administrator, wherein to generate the policy the SPA tool:

generates a first policy configuration that is customizable by an authorized second tier level security administrator, thus providing a first customizable policy configuration;

stores the first customizable policy configuration in a policy configuration database; and transmits the first customizable policy configuration to a target IHS within a particular data center of the plurality of data centers;

wherein the SPA tool further:

receives a policy customization request from a second user;

tests to determine if the second user is an authorized second tier level security administrator; and modifies the stored first customizable policy configuration as requested in the policy customization request of the second user if the second user is determined to be an authorized second tier level security administrator.

12. The enterprise network of claim 11, wherein the security enforcement tool at a particular data center tests to determine if an installed policy configuration in a particular target IHS matches the stored policy configuration in the policy configuration database.

13. The enterprise network of claim 12, wherein the security enforcement tool limits operation of the particular target IHS if the installed policy configuration does not match the stored policy configuration in the policy configuration database.

14. The enterprise network of claim 11, wherein the security enforcement tool disallows the policy customization request from the second user if the second user is determined to not be an authorized second tier level security administrator.

15. The enterprise network of claim 11, wherein the security enforcement tool allows access of a third user to the target IHS in accordance with the policy configuration applicable to the target IHS, wherein the third user is a user other than a first tier level security administrator and a plurality of second tier level security administrators.

16. The enterprise network of claim 11, the first customizable policy configuration includes a customizable mapped name in at least a portion of the first customizable policy configuration, the customizable mapped name taking the place of a specific value wherein an authorized second tier level security administrator customizes the customizable mapped name with a local specific value.

17. The enterprise network of claim 12, wherein a particular target IHS includes an agent tool for monitoring the installed filter policy in the particular target IHS, wherein the agent tool reports to the security enforcement tool the installed filter policy of the target IHS, and the security enforcement tool enforces the installed filter policy on the target IHS.

18. The enterprise network of claim 11, wherein the first customizable policy configuration is represented by one or more security policy rule profile names which include a concatenation of name elements wherein at least one of the name elements includes a wildcarded name element, wherein the wildcarded name element replaces a specific value local to the target IHS within a particular data center.

19. The enterprise network of claim 11, wherein the first customizable policy configuration includes a naming policy including combinations of levels, the levels including at least one of a Symbolic Level, an AdminAction Level, a Rule Level, an IHS Level, an IHS Group Level, a Policy Type Level, and wherein at least one of the levels includes the wildcard level that governs automatic creation of the first customizable security policy rule profile name or names.

20. The enterprise network of claim 11, wherein the SPA tool uses the first customizable security policy rule profile name to control access to the first customizable mapped name by the second tier level security administrator.

* * * * *